United States Patent [19]

Krueger et al.

[11] Patent Number: 4,962,533
[45] Date of Patent: Oct. 9, 1990

[54] DATA PROTECTION FOR COMPUTER SYSTEMS

[75] Inventors: Steven D. Krueger, Houston, Tex.; Martha A. Branstad, Gaithersburg; Stephen T. Walker, Glenwood, both of Md.

[73] Assignee: Texas Instrument Incorporated, Dallas, Tex.

[21] Appl. No.: 312,142

[22] Filed: Feb. 17, 1989

[51] Int. Cl.⁵ .............................................. H04L 9/00
[52] U.S. Cl. .......................................... 380/25; 380/4; 380/49
[58] Field of Search ................................. 380/4, 25, 49

[56] References Cited

U.S. PATENT DOCUMENTS 4,802,218 1/1989 Wright et al. ...................... 380/25

OTHER PUBLICATIONS

Defense RDT&E Online System, Defense Logistics Agency, 10/86, pp. 4-20, 22, 34.

Primary Examiner—Thomas H. Tarcza
Assistant Examiner—David Cain
Attorney, Agent, or Firm—L. Joy Griebenow; James T. Comfort; Melvin Sharp

[57] ABSTRACT

A computer system uses security labels for evey word in memory. Each access to a memory location requires that the security level of the memory location be compared to that of a process which is making the access. If the security level of the process does not dominate that of the memory location, access is denied. Each time a memory location is modified, it is assigned a security level consistent with the levels of all of the data which was used to modify the memory location.

4 Claims, 3 Drawing Sheets

DATA PROTECTION FOR COMPUTER SYSTEMS

BACKGROUND AND SUMMARY OF THE INVENTION

The present invention relates generally to digital computer systems, and more specifically to a system and method for controlling user access to data within a computer system.

In the short history of computers, data security was originally relatively unimportant and synonymous with physical security of the computer. But the importance of data security has grown steadily as the quantity, value and sensitivity of the data stored in, and operated upon by, computers has increased. The rate of growth of the quantity, value and sensitivity of computerized data is increasing rapidly. In addition, the importance and pervasiveness of data communications has rendered physicall security alone insufficient to protect a computer system and its sensitive data from unauthorized access.

Current security measures for computer systems usually utilize an access control list (ACL) or equivalent mechanism. An ACL is associated with an object within the computer system, such object generally being a program, file, or directory. The ACL is a list which describes who may access that object, and in what manner it may be accessed. Typical types of access are read, write, execute, and delete. A summary overview of typical computer security systems can be found in "Operating System Concepts", J. Peterson and A. Silberschatz, chapter 11, Addison-Wesley Publishing Co., 1985.

As described in "Secure Computing: The Secure Ada Target Approach", *Scientific Honeyweller*, vol. 6, no. 2, July 1985, the use of ACLs does not protect a computer system from all kinds of intrusion. In particular, programs known as "trojan horses" and "viruses" can bypass the protection provided by ACLs. ACLs do not provide the level of security necessary to protect sensitive, classified defense documents.

In the Defense Department of the United States, all information has one of four classification levels: unclassified, confidential, secret, or top secret. Within the secret and top secret classifications, information is further subdivided into categories called "compartments". For example, within the top secret classification, information may be divided into compartments related to troop dispositions, star wars defense system, nuclear weapons construction, and nuclear weapons disposition. Simply having a top secret clearance does not allow a person or computer process access to all this information; they must also be cleared for access to each particular compartment. Thus, for a user to have access to information and programs on a computer system, he must have clearance for access to both the proper classification and compartment.

In 1975, Bell & Padula, as described in "Secure Computer System: Unified Exposition and Multics Interpretation", MITRE Technical Report MTR 2997, July 1975, developed a security policy model which was sufficient to provide security adequate to meet Defense Department standards. The description of their system still provides the basic definition of a secure computer system used by the Defense Department.

In the Bell & Padula system, access is granted to information on a per process basis. Every file or program has a classification, including one or more compartments, and only users and processes which are cleared for access to that type of information and program may utilize them.

The general approach taken by such prior art systems is to group information into "containers". A container contains a collection of related data, such as a file, or a logical executable block code, such as a program or subprogram. All data in a container is classified at the same level, simply because it is in the container. It is very common for some data in a container to be overclassified because of its location. There is no attempt to classify data items individually. This is analogous to classifying an entire printed document at a high level because it containes 2 sensitive paragraphs, even though the remainder of the document would not otherwise be classified.

For example, if any data in a file is sensitive enough to require a high classification, the entire file must be so classified. There is no straightforward, reliable mechanism for separating these sensitive and non-sensitive data within a particular file. Thus, whenever an item of sensitive information is placed in the file, most of the file may be overclassified because of its association with the sensitive data. Over time, this situation can lead to a large number of files and programs being highly classified, when such high classification is not necessary for most of the data. Information which is unclassified or classified at a low level, and which must become classified at a higher level because of its association with one or more highly classified items, can be said to be "tainted".

It would be desirable for a computer system to be able to classify data only at the level which is needed. Data which must be highly classified should be assured of such classification, while data with a lower classification would avoid becoming tainted and would retain such lower classification.

It is therefore an object of the present invention to provide a security technique for a computer system in which all data retains its classification, and in which no data is overclassified.

Thus, according to the present invention, in a computer system every word in the memory has a corresponding label. This label indicates the security classification, and compartments if any, of that word of data. Each time a word is accessed by any instruction, its classification is checked to see if access is allowed.

The classification labels are contained in a security memory which is separate from the user accessable data memory. Consideration of the label of each word is made in a security unit which is likewise inaccessible to the user. Any attempt to improperly access any word within the computer system's memory generates a security violation and prohibits further execution of the currently running process.

The novel features which characterize the present invention are defined by the appended claims. The foregoing and other objects and advantages of the present invention will hereafter appear, and for purposes of illustration, but not of limitation, a preferred embodiment is shown in the accompanying drawings.

DETAILED DESCRIPTION OF THE PREFERRED EMBODIMENTS

Figure 1:
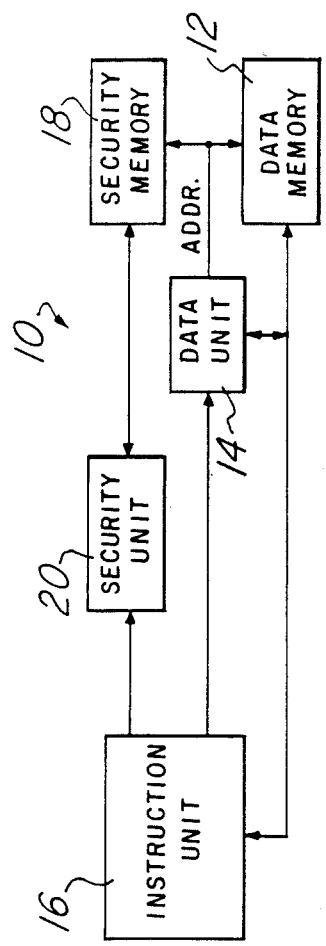
FIG. 1 is a block diagram of a system including a security memory and a security unit according to the present invention.

The discussion of the preferred embodiments which follows implements two properties required of secure computer systems by the Bell & La Padula model of computer security. These properties are the simple security property and the *-property.

One feature of the current technique is the labeling of individual data words with a security level. Every word of storage and every register within the system has a label. For purposes of security, every data word within the system becomes an object in the sense of Bell & La Padula.

Every process executing on the computer system is termed a subject. Every subject is associated with a user by a security kernel of the operating system. This is usually done by using some combination of restricted physical access and personal identifiers such as passwords. Every subject has a maximum level of clearance. This maximum level is a part of the process state, and is maintained within the processor. The maximum level of a subject is not chageable by the subject. This level may be changed only by a trusted part of the security kernel of the operating system.

The simple-security property states that no subject can access an object unless the level of the subject dominates the level of the object. Dominates is a binary relation between the security classifications of two objects, and is defined below.

The *-property means, generally, that a subject may not make use of information obtained, directly or indirectly, from a highly classified object in order to modify a lower classified object. This may be stated more formally as "a subject may not simultaneously have 'observe' access to object-one and 'alter' access to object-two unless the level of object-one is dominated by the level of object-two". In addition, information which might be indirectly contained in the control state of an operating process cannot be used to modify the contents of an object which has a lower security classification than the objects which were used to determine the current control state of the process. This is explained in more detail in connection with FIGS. 2 and 4.

The level of a subject dominates the level of an object only if the maximum classification of the subject is greater than or equal to the classification of the object, and the subject is permitted access to every compartment to which the object belongs. This may be stated more formally as:

a $\delta$ b iff
classification(a) $\geq$ classification(b)
& compartments(b) $\subseteq$ compartments(a)

Classification levels are typically confidential, secret and top secret. Compartments may be any of a large number of subject matters. For purposes of illustration in the following description, classifications will be considered to be numerical levels, and compartments will be simply lettered by single letters of the alphabet.

The following examples of the $\delta$ relation use the classifications and compartments shown for the objects in Table I. For the objects of Table I, the following relations are true: d $\delta$ b; and d $\delta$ c. It is easily seen that these relations are true because, in eahc case, the classification level of the left hand object of the relation is greater than or equal to that of the right hand object, and every item in the set of compartments of the right hand object is contained in the set of compartments of the left hand object. The $\delta$ relation is false for all remaining pairs of objects in Table I. For example, b $\delta$ a is false because object b does not have access to compartment b, and a $\delta$ b is false because the classification of a is less than the classification of b.

TABLE I

| OBJECT | CLASSIFICATION | COMPARTMENTS |
|---|---|---|
| a | 1 | B,C |
| b | 2 | C |
| c | 3 | A,D |
| d | 3 | A,C,D |

Referring to FIG. 1, a high level block diagram of a system implementing the present invention is shown. A computer system 10 includes a conventional data memory 12. Arithmetical and logical operations on data contained within the data memory 12 are performed in a data unit 14. An instruction unit 16 fetches instructions from the data memory 12 and causes the functions of the data unit 14 to be exercised upon data objects in the memory 12.

In addition to the data memory 12, a security memory 18 contains the classification information for each word of the data memory 12. Security operations upon the information in the security memory 18 are performed by a security unit 20. The actual function of the security unit 20 depends upon the type of instruction currently being executed, which is identified to the security unit 20 by the instruction unit 16. The security memory 18 and data memory 12 operate completely in parallel, and are addressed simultaneously from the data unit through the address signal ADDR.

It can be seen from the diagram of FIG. 1 that the security features of the present system can be added to almost any conventional computer system with relative ease. The security unit 20 operates in parallel with, but completely independently from, the data unit 14. Likewise, the security memory 18 and data memory 12 are completely independent.

Figure 2:
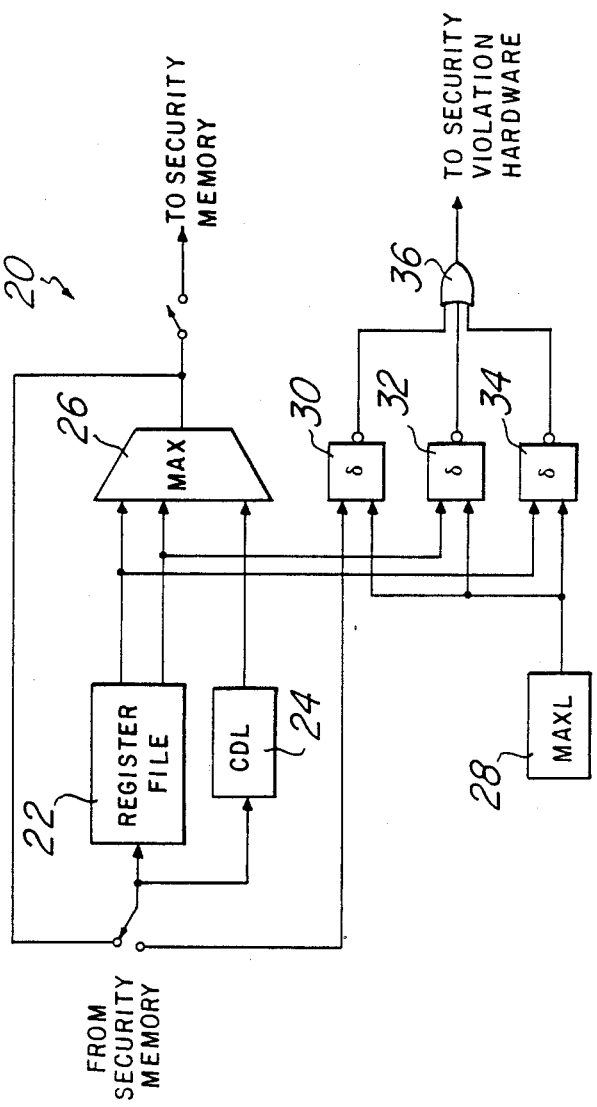
FIG. 2 is a block diagram of a preferred security unit.

A block diagram of the more detailed functions of the security unit 20 is shown in FIG. 2. The system described below is a load/store processor. However, the described system can easily be modified slightly to function with other types of processors as will become apparent to those skilled in the art.

A register file 22 of security labels contains all of the labels for a similar register file (not shown) within the data unit 14. A CDL register 24 contains a Control Domain Level, which will be described further below. The CDL is a security label identical in type to those used in the register file 22.

A maximum level function (MAX) is performed in a comparison block 26. The inputs to the block 26 are the contents of the CDL 24 and one or two (however many are used in execution of the present instruction) of the labels from the register file 22. The MAX block computes the lowest security level that dominates its inputs. For example, the output of MAX for the objects a and b of Table I would be classification(2) and compartments(B,C). The MAX block 26 operates approximately in parallel with the ALU (not shown) of the data unit. Thus, when the data unit operates on two registers from its register file, and stores the result into a third register in the register file, the MAX function finds the lowest dominating level of the two input registers, and stores the result into the label for the third register. When a data object is written to the data memory 12, its security label (generated in MAX 26) is simultaneously written to the security memory 18. The calculation of the MAX function for data operations satisfies the part of the *-property which relates to the results of calculations.

A MAXL register 28 contains the security clearance for the currently executing process. Like the CDL register 24, MAXL contains the information in a standard security label. Three logic blocks 30, 32, 34 perform the $\delta$ function, and generate logical true and false signals which are OR'd together in OR gate 36.

Upon the execution of each instruction, the MAXL of the subject (process) is compared to the security level of each of the inputs to the instruction. If one value is needed from the register file, it is compared in logical block 34, and if a second value is needed from a register it is compared in logical block 32. If a value is read from memory, it is compared to MAXL in logic block 30.

A single instruction generally does not require the use of all three logic blocks simultaneously. For example, when a value is simply read from memory, its label is obtained from the security memory 18 and compared to MAXL and logic block 30. Since nothing is being read from the register file, no signal is applied to logic blocks 32 and 34, which, by default, indicate that the $\delta$ relation is satisfied. If two registers are being compared, the logic block 30 is not needed, and generates a true response by default.

The outputs of logic blocks 30, 32, and 34 are inverted prior to being appled to the OR gate 36. A logical 1 is applied to the OR gate 36 by any logic block 30, 32, 34 for which the $\delta$ relation fails. If any of the logic blocks 30, 32 or 34 indicate that the $\delta$ relation is not satisfied, the output of OR gate 36 is true, triggering security violation hardware. The nature of this hardware depends upon the particular system implementation, but typically includes at least an immediate halt of instruction execution and a trap to a security violation handler in the trusted operating system kernel. The calculation of the $\delta$ function in logic blocks 30, 32, and 34 satisfies the simple security requirement by preventing the subject from accessing any data for which it is not authorized.

The CDL register 24 is used because information regarding the value of an object can be stored in a current control state of the executing process. A simple example can be shown, again using the objects of Table I. If the following code fragment is executed, it is seen that the value of object m is calculated based on information derived through the control structure of the if statement in connection with the value of object c. This means that, indirectly, the value of object c is used to compute the value of object m. This is inconsistent with the requirements of the *-property as described above.

```
if (c > 0) then
    m: = a
  else
    m: = d;
```

The value in the CDL register 24 in the security unit 20 is used to preserve the *-property for control information. The output of the MAX function 26 is placed into the CDL register 24 on conditional control operations. Thus, in the example described above, when the comparison of c and 0 is made, the security label for the antecedents of the conditional is the lowest classification which dominates c and the constant 0, and is placed into the CDL register 24. Later, when a value is assigned to object m, the fact that information based on the security classification of object c is indirectly used in the computation is represented by the value of CDL. When m is assigned a value, the function MAX(a,CDL) determines the label for m if c>0, and the function MAX(d,CDL) determines the label for m if c$\leq$0.

Since the result of the assignment statement changes the value of m, for purposes of discussion assumed to be in a register, the label for m is also changed to the value determined by the MAX block 26. Thus, the security label of object m has been set to indicate that its value is dependent upon the classification of object c as well as that of either a or d. Since the MAX block 26 is comparing the current value of the CDL register with other objects when conditional instructions are executed, and generating a security label which dominates all of its inputs, it can be seen that the value of the CDL register 24 does not decrease.

Figure 3:
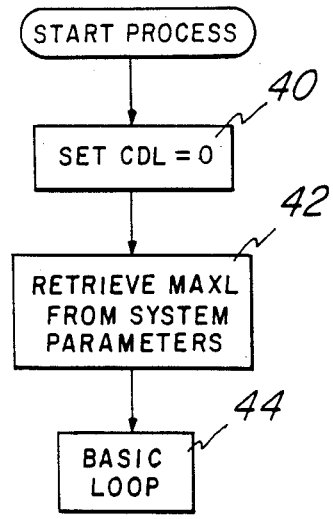
FIG. 3 is a flow chart of the initialization steps for a new process.

Referring to FIG. 3, a flow chart describing the startup procedure for a new process is shown. When a new process is initiated, the CDL is set=0 (step 40). This means that the value in the CDL register 24 is the lowest possible value; unclassified. Next, in step 42, MAXL for the process is retrieved from system parameters and placed into the MAXL register 28. Normal execution of the process then continues. This can be represented insofar as it relates to the security aspects of the system as the basic loop 44.

Figure 4:
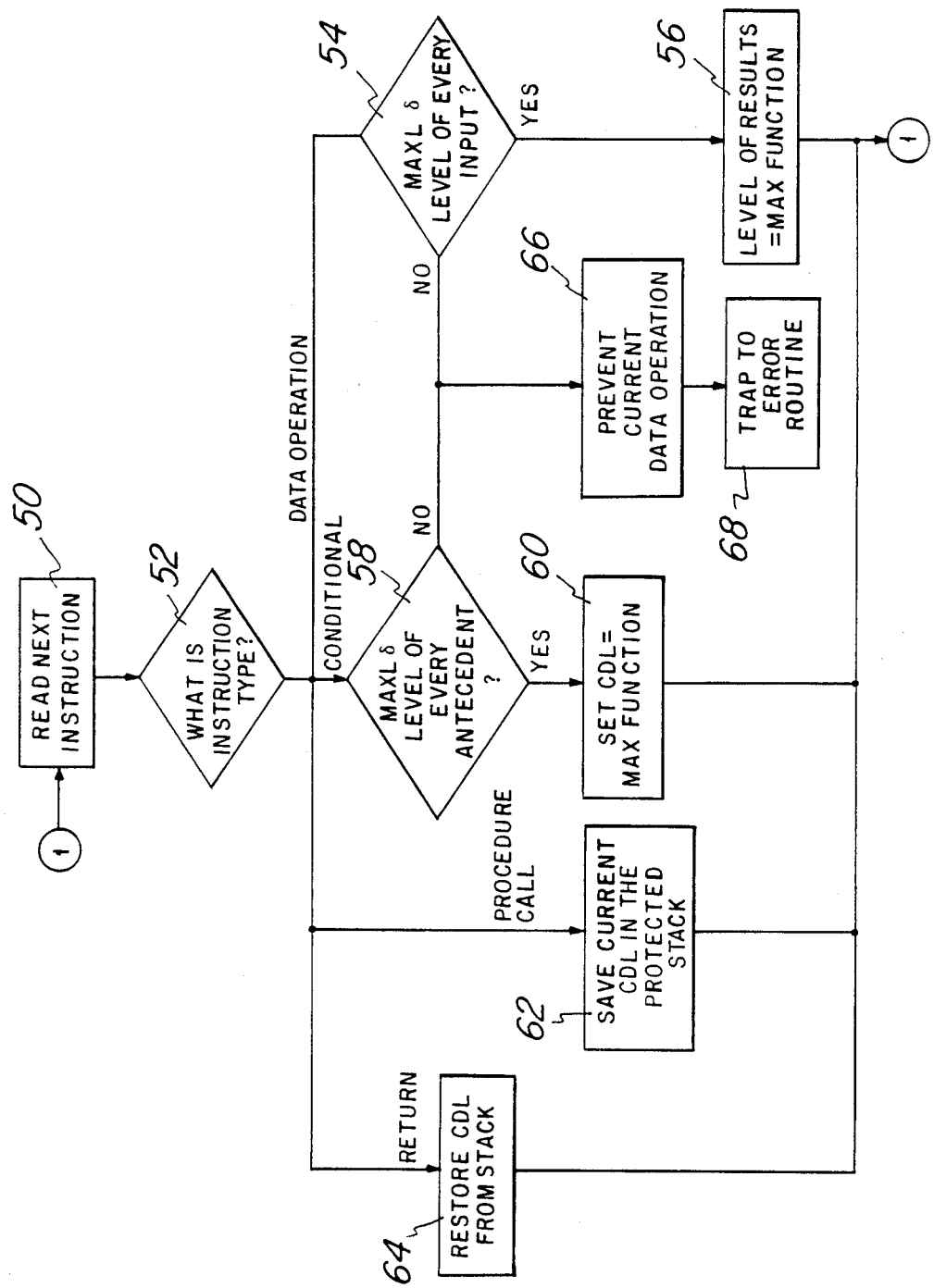
FIG. 4 is a flow chart illustrating the decisions made in the security unit.

Referring to FIG. 4, a flow chart indicating the logical processes behind operation of the security unit 20 in conjunction with the instruction unit 16 and security memory 18 is shown. The next instruction is read (step 50), and a determination of its type is made (51). The instruction is categorized into one of four classes; a data operation, a conditional instruction, a procedure call or a return from a procedure.

If the instruction is a data operation, such as adding or subtracting two registers, a test is made (step 54) to see if MAXL dominates the level of every input. This is done in logic blocks 32 and 34 as described in connection with FIG. 2. If this is not the case, a security violation is raised. If this function is satisfied, control passes to block 56, where the security level of the result of the operation, be it a register or a location in memory, is set to equal the output of the MAX block 26 as described in connection with FIG. 2. This level is the minimum level which dominates all of the inputs. Control then passes to point 1 of the flow chart, allowing the next instruction to be read.

If the instruction type, as determined in step 52, is a conditional, MAXL is tested (step 58) to see whether it dominates the level of every antecedent. If it does, the value of the CDL register 24 is set to a level which dominates all of the antecedents as described above (step 60). At the same time, the data unit 14 evaluates the condition and instructs the instruction unit 16 to jump to a new instruction location if the condition is true, or to continue with the next instruction if the condition is false.

If the instruction type is a procedure call, the current value of the CDL register 24 is saved in a protected stack (step 62). This stack is a data structure which is protected by the security kernel, and is not accessible by normal executing processes except for procedure calls and returns. This save is done at the same time that the current processor state, needed upon return from the procedure call, is stored on the normal protected stack. A call is made to the procedure in the normal manner by te data unit.

If the instruction type is a return from procedure, the CDL is restored from the protected stack (step 64). At the same time, the processor state is restored from the system stack by the data unit 14. Storage of the CDL in a protected stack in the manner described allows the CDL to increase to a higher level during a procedure call, and be restored to a lower level upon return from the procedure. Since, upon return from a procedure, no information computed during the procedure is contained in the current control state of the process, it is not necessary for the CDL to remain at any higher state which may have been reached during the procedure call. The higher state will be reflected in any results generated by the procedure.

When either the data operation path or the conditional path is followed, the δ function is invoked. If this relation fails, control passes to point 2 in the flowchart. At this point, the currently executing data operation is interrupted and prevented from completing (step 66), and control passes to a security violation handler which is part of the security kernel (step 68). The security violation handler can inform the user that this action is not allowed and allow the user's process to recover, or it can abort operation of the process. An entry can be made in an accounting file in order to track attempted access violations.

The indirect knowledge of highly classified information which is inherently known during execution of a conditional is no longer known once that conditional has been exited. Thus, in the example described above, once control transfers out of the if statement entirely, the value of object c is forgotten so far as flow of control is concerned. This is true for other conditionals as well.

So far as indirect knowledge of higher classified information is concerned, entering and exiting a conditional statement has the same effect as the call/return of a procedure. Thus, if desired, all conditional statements could be executed by calling a special procedure, so that upon completing the conditional, the CDL returns to its former value. This technique would prevent the CDL from always getting higher and could be performed automatically by a compiler.

The compiler is not relied upon to prevent data security violations.

Referring to FIG. 5, several alternative label formats are described. FIG. 5(a) illustrates that the security label is considered to be an extension of the data word. As described in connection with FIG. 1, it is preferably physically separated from the data word. FIG. 5(b) shows the simplest labeling scheme, in which each word is simply given a numerical classification. With this type of label, the δ function is a simple arithmetical comparison.

Figure 5A:
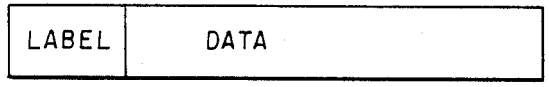
FIG. 5 illustrates several alternative techniques which can be used for classification labels associated with data words.
Figure 5B:
Figure 5C:
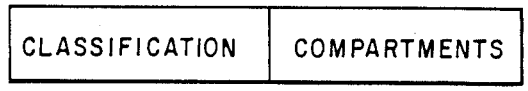

FIG. 5(c) shows a slightly more complex labeling scheme. In this scheme, part of the label is used for a numerical classification, with the remaining bits used to indicate compartment membership. This type of label is suitable for use with the objects shown in

TABLE II

| OBJECT | CLASSIFI-CATION | COMPARTMENTS | LABEL |
| --- | --- | --- | --- |
| a | 1 | B,C | 01/0110 |
| b | 2 | C | 10/0010 |
| c | 3 | A,D | 11/1001 |
| d | 3 | A,C,D | 11/1011 |

Table I. The classification could be, for example, a two bit value, indicating levels 0–3, and the compartments field could contain four (or more) bits. Each bit indicates whether or not that object requires clearance for a particular compartment. If the bit fields are matched left to right with compartments A, B, C, and D, the labels for the objects a, b, c and d for the given classifications are shown in Table II.

It will be appreciated that a large number of possible compartments would require that a large number of bit positions be used. This could often be a waste of space, inasmuch as few objects belong to more than one compartment and most pairs of compartments are mutually exclusive. For example, if there are 16 possible compartments and four levels of classification, the schema of FIG. 5(c) would require a label that is 18 bits wide. However, if these compartments can be grouped into four groups of four compartments each, the width of the label can be reduced to eight bits using the schema of FIG. 5(d). Note that use of this schema requires that it be known in advance that the groups be mutually exclusive; that is, the groups can be defined so that no data object will ever need to be assigned a security label for compartments which are contained in different groups.

Figure 5D:

The scheme of FIG. 5(d) uses a numeric classification, a numeric compartment group field, and a bit field for compartments as described above. All of the compartments are placedd into groups having no more than 4 compartments each. Each group is given a number, and the compartments in each group are ranked so that they correspond positionally with the bits in the compartments field. In order to determine which compartments an object has access to, the compartment group must be determined in order to decode the compartments bit field. If 16 compartments can be placed into 4 groups of four compartments each, and there are 4 levels of classification, the labelling format of FIG. 5(d) requires only 8 bits to completely label each object.

Figure 6:
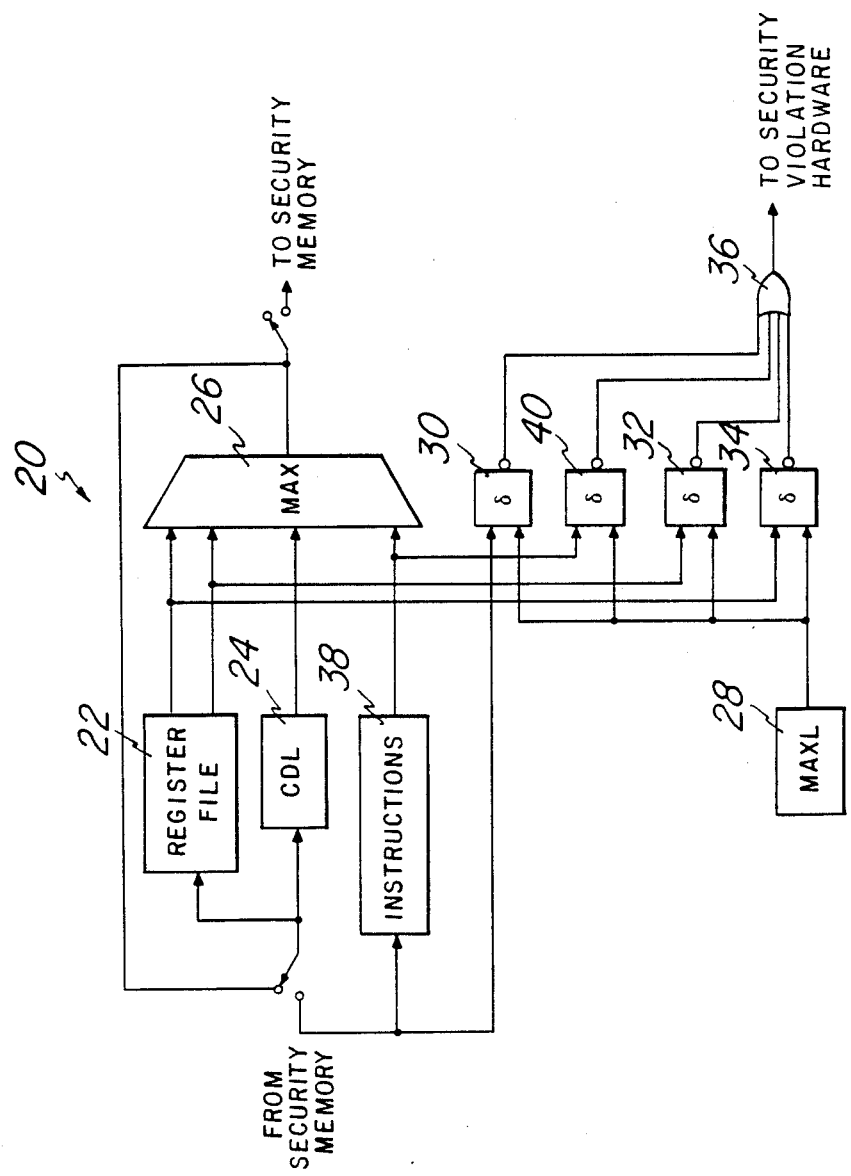
FIG. 6 is an alternative embodiment of a security unit which includes checking of the clearance level for each instruction executed in a program.

FIG. 6 shows an alternative embodiment of a security unit 20. Most of the elements of the alternative embodiment are the same as those shown in FIG. 2, and operate in the same manner as described therein. Two new items have been added: an instruction label register 38 and an additionallogic block 40 for testing the δ relation. The instruction label register 38 contains the security label for the currently executing instruction. The MAX function block 26 uses the instruction label register 26 as simply another input to be considered. The label for the current instruction is compared to MAXL in logic block 40 in the usual, and flags a violation if the security level of the instruction is not dominated by MAXL.

The purpose of including the instruciton label register 38 is to allow executable code to be classified at the same fine-grained level that is used for data. So long as the subject has the proper clearance to execute the code, such execution is allowed.

While the present invention has been described in terms of a preferred embodiment, it will become apparent to those skilled in the art that various modifications and alterations can be made to the described system and method. The scope of the invention is not limited to the described embodiment, but instead is defined by the appended claims.

What is claimed is:

1. A computer system, comprising:
   an instruction unit;
   a data memory;
   a data unit coupled to said instruction unit, wherein said instruction unit reads instructions from said data memory, and causes said data unit to perform arithmetical and logical functions on data taken from said data memory;
   a security memory in parallel with said data memory, wherein said security memory contains a security label for each location in said data memory; and
   a security unit, wherein said security unit, for each instruction performed in said data unit, compares the security level for all data used by the instruction with a clearance level for a user, and which assigns to every modified memory location a security level which dominates the levels of all data used to determine the modified value of such memory location.

2. A method for providing security for a computer system, comprising the steps of:
   (a) for each machine language instruction to be executed, determining the type of the instruction;
   (b) if the instruction is, as determined in step (a), a data operation, then if the security level of a user dominates the level of each data word used by the instruction, allowing the instruction to be performed and giving any result a security level which dominates all of the data words used by the instruction and a control domain level, else preventing execution of the instruction;
   (c) if the instruciton is a conditional, then if the security level of the user dominates the level of all antecedents for the condition, setting the control domain level to a level which dominates all of such antecedents and allowing the instruction to be performed, else preventing execution of the instruction;
   (d) if the instruction is a procedure call, storing the current control domain level on a stack; and
   (e) if the instruction is a return from a procedure, setting the control domain level to the value that was stored on the stack when such procedure was called.

3. The method of claim 2, said conditional instruction could be generated by the compiler from a conditional statement.

4. The method of claim 3, said conditional statement could be transformed into a procedural call.

* * * * *